3,233,106
PERIOD METERS HAVING A VARIABLE
TIME CONSTANT
Donald Harrison, Broadstone, Dorset, Eliot Patrick Fowler, Piddletrenthide, Dorset, and Gerald Keith Lunn, Surbiton, Surrey, England, assignors to United Kingdom Atomic Energy Authority, London, England
Filed Apr. 16, 1962, Ser. No. 187,543
Claims priority, application Great Britain, May 12, 1961, 17,458/61
11 Claims. (Cl. 250—83.3)

This invention relates to period meters for nuclear reactors.

A period meter has been previously proposed in which the response from a flux sensitive device such as an ionisation chamber located, for example, in a nuclear reactor, is fed as an electrical input current to a logarithmic amplifier yielding an output voltage proportional to the lorarithm of the input current. The output voltage of the logarithmic amplifier is applied to a differentiating amplifier to provide period information which may be indicated visually on a meter calibrated in reactor doubling time.

It has been found that in order to reduce circuit noise conditions in such systems, greater smoothing is required at the lower current end of the instrument range than at the high current end and this may be achieved by making use of the change in resistance in the logarithmic element in the log. amplifier, as the input current changes, to effect a consequential variation in the time constant of the system.

It has been appreciated, however, that the resultant change in the long time constant at the low input current end of the instrument range will give an overshoot in period indication especially if the period is short. Overshoot may occur, but to a lesser extent, at the higher current end of the instrument's range. This problem is discussed more fully in Paper P/56 of the Proceedings of 1953 Geneva Conference on the Peaceful Uses of Atomic Energy; published in vol. II, pp. 498–508.

According to the present invention in a period meter having a logarithmic amplifier providing an output proportional to the logarithm of input current and a differentiating amplifier connected to supply period information from said output, the differentiating amplifier includes a variable time constant circuit comprising circuit components whose impedance contributes to the time constant of the differentiating amplifier and is controllable independently by means of a circuit for varying the effective impedance of the circuit component in accordance with the output of the logarithmic amplifier.

The aforesaid element may be a thermistor element suitably compensated for ambient temperature variations. Alternatively, a transistor switching circuit in the form of a transistor chopper driven by a blocking oscillator may be used.

Figure 1:
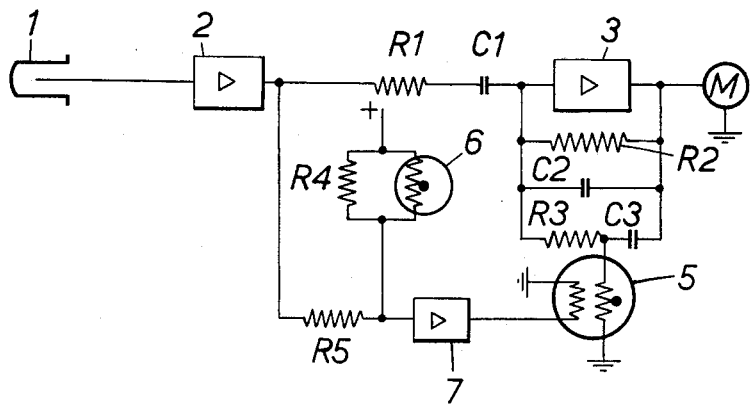
Figure 2:
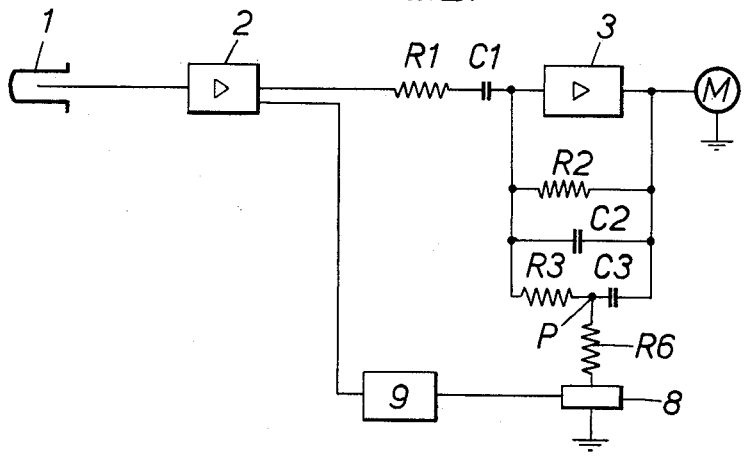
Figure 3:
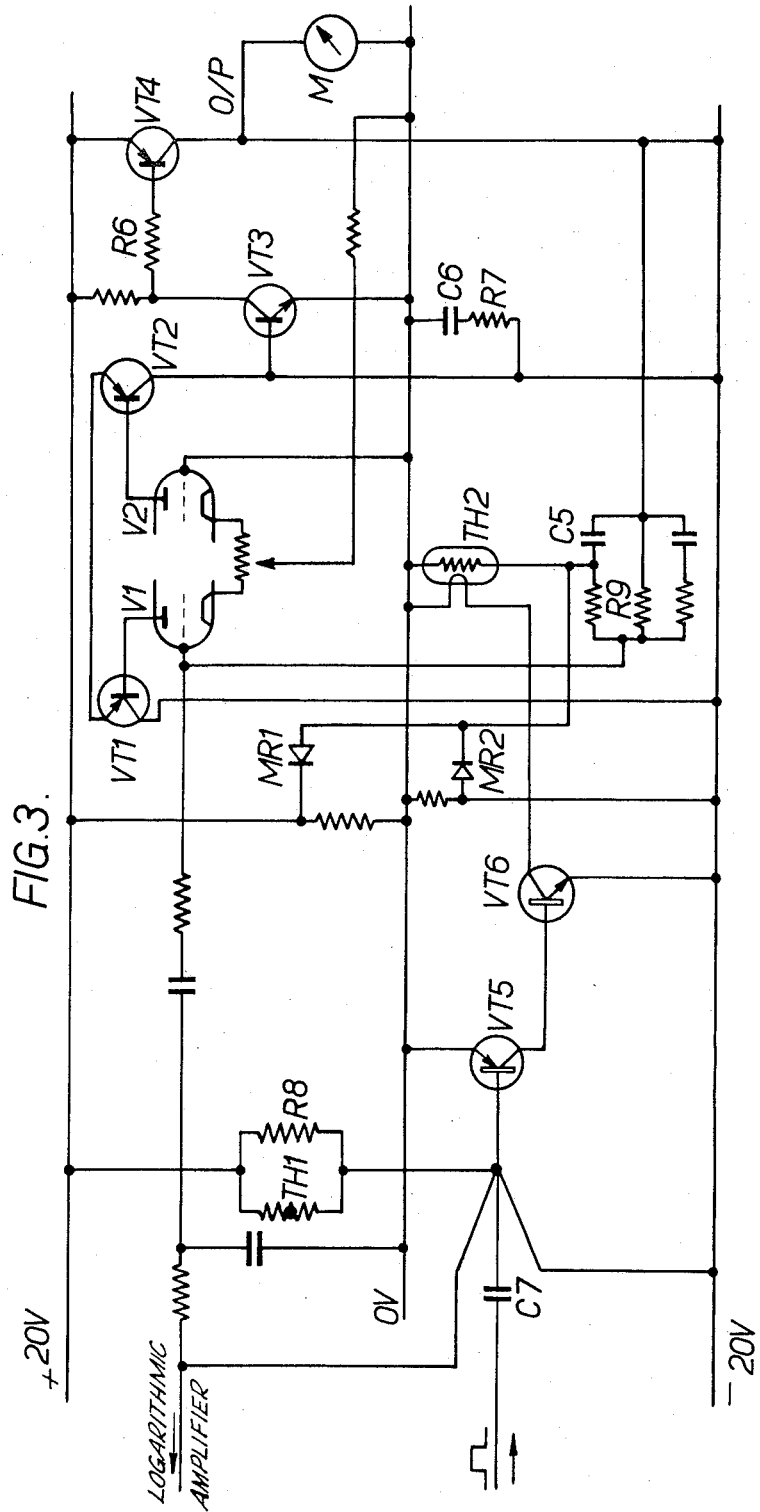
Figure 4:
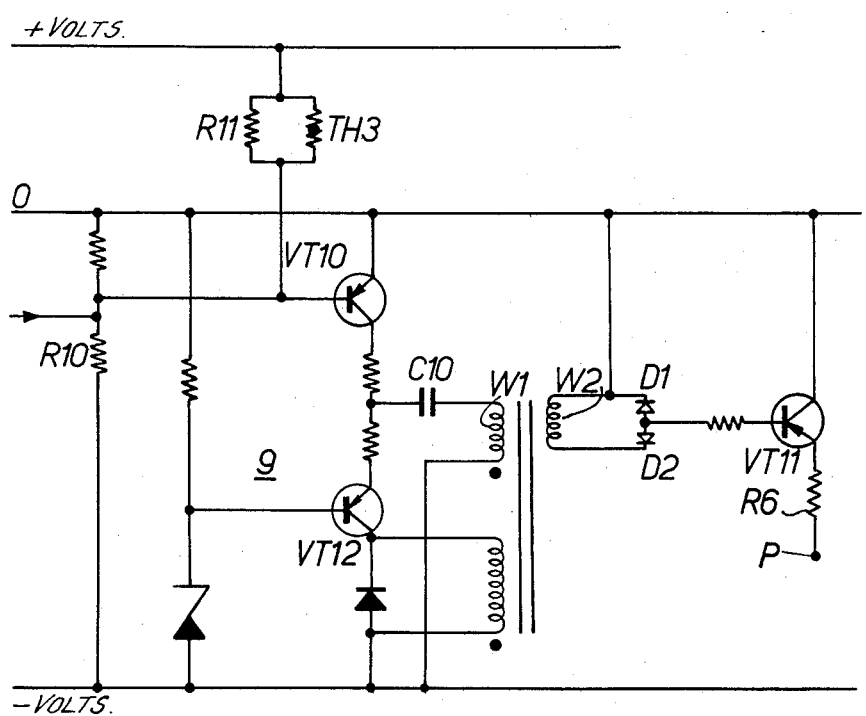

In order that the invention may be more fully understood two embodiments thereof will now be described with reference to the accompanying drawings in which:

FIGS. 1 and 2 show diagrammatically two alternative ways by which the time constant of the differentiating amplifier may be varied, FIG. 3 is a more detailed circuit of the differentiating amplifier incorporating the variable time constant control circuit of FIG. 1, and FIG. 4 shows a detailed variable time constant circuit of FIG. 2.

In FIG. 1 an ionisation chamber 1 exposed to radiation in a nuclear reactor is arranged to feed current to a logarithmic current amplifier 2. The output from the amplifier 2 is applied to linear D.C. voltage amplifier 3 having a differentiating circuit which includes an input capacitor C1 and a resistor R2 connected across the amplifier 3. For smoothing purposes the amplifier 3 includes a resistor R1 connected in series with the capacitor C1 and a capacitor C2 connected in parallel with resistor R2.

The output voltage from the amplifier 3 which is proportional to rate of change in its input voltage, and hence to reactor period, is indicated on a meter M calibrated in reactor doubling time. A resistor R3 and a capacitor C3 are connected in series across the capacitor C2, the resistor R3 being connected to the input of the amplifier 3 and the capacitor C3 to its output. The point between the resistor R3 and the capacitor C3 is referred to as the junction point.

The time constant of the logarithmic amplifier 2 is made as small as possible, while that of the differentiating amplifier 3 is made as large as is consistent with an acceptable noise level at low input current conditions. The time constant of the differentiating amplifier is governed by the effectiveness of the capacitor C3.

The effectiveness of the capacitor C3 is varied by varying the impedance between the said junction point and earth by means of a variable resistance element here shown as a thermistor 5. The junction of resistor R3 and the variable resistance element to which the left hand side of capacitor C3 is connected is thus seen to constitute a variable tapping on a potential divider connected between the input of amplifier 3 and earth.

To this end, the heater current for the thermistor is controlled from the output stage of the logarithmic amplifier 2. It can be shown that there is an inverse square law relationship between the resistance of the thermistor and the output of the amplifier 2.

The current flowing through the heater of the thermistor is thus made to increase as the logarithm of the reactor power increases, and the reduction in the impedance of its coil reduces the effectiveness of the capacitor 3 in restricting the circuit band width and hence reduces the time constant as the logarithm of reactor power increases.

In order to ensure that ambient temperature changes do not influence the characteristics of the thermistor this device may be enclosed in a constant temperature oven. More simply, however, the thermistor heater may be heated by a current controlled by a second compensating thermistor 6 as shown.

The thermistor 6, the resistance of which is affected only by ambient temperature (apart from a negligible influence due to the current passed by it) is connected in parallel with a resistor R4, and both are connected to a positive line supplied with D.C. Current from the positive line passed by the thermistor is fed to a D.C. amplifier 7, the output from which determines the heating current for the thermistor 5. The power output stage of the logarithmic amplifier is connected to the input amplifier 7 through resistor R5.

Any variation in the ambient temperature will result in an increase or decrease of the resistance of the compensating thermistor 6 and will accordingly decrease or increase the current flowing to the summing junction from the positive line. This current is in opposition to that obtained from the output stage of the logarithmic amplifier 2 through resistor R5 and, by appropriate adjustment of resistor R4, is made to compensate for variation in resistance of the control thermistor 5 due to ambient temperature changes.

Hence the resistance of thermistor 5 can be made dependent upon the output of logarithmic amplifier 2 and unaffected by ambient temperature variations.

As an alternative to the thermistor control of the differentiating amplifier time constant described above a transistor switching arrangement may be used as shown in FIG. 2.

A chopper transistor 8 is connected to a junction P between the circuit R3, C3 and earth through resistor R6 with its base connected to the output stage of amplifier 2 through a control circuit 9.

The transistor 8 has its base connected through the control circuit 9 to the output stage of the logarithmic amplifier. Smooth control of the impedance presented by the collector is difficult to achieve. For example, on open circuit the collector of the transistor would follow the base voltage until sufficient base current is passed to drop the collector/emitter impedance to below the base/collector impedance. The collector voltage would then drop to zero. The element 9 shown here diagrammatically, can be any oscillator device which ensures that the transistor 8 is either in the "off" condition when the collector/emitter impedance is very high or in the "on" condition when the collector/emitter impedance will be very low and with a small voltage (about 1 mv.) across the collector/emitter. Thus, when a sequential on-off switching of the transistor is effected then a mean impedance is presented (looking out from the summing point) which is determined by the on-off time ratio. Hence, by varying the on-off time ratio, a variation in mean impedance of the differentiating amplifier is achieved. In FIG. 2, the circuit 9 varies the on-off time ratio in accordance with the square root of the output of the logarithmic amplifier, or some approximation to this, and may produce oscillations for this purpose which vary in their mark/space ratio by change in pulse width, while the frequency is fixed, or by changes in their frequency keeping the pulse width fixed.

The control circuit 9 may be a blocking oscillator.

Referring now to FIG. 3 the differentiating amplifier shown has an input circuit, which constitutes the first two stages of the amplifier, comprising a long tailed pair, each half of which constitutes an electrometer triode V1, V2 driving silicon transistors VT1, VT2. The collector voltage of the transistor VT2 provides the input to the third stage of the amplifier which is n.p.n. silicon transistor VT3 connected as a common emitter amplifier between the 0 and +20 volt lines. The output stage of the amplifier is a silicon transistor VT4 connected as a common emitter between the positive and negative voltage lines. The base resistor R6 of VT4 limits the output transistor base current and thereby protects the third stage and the output stage transistors against accidental damage or momentary overloads. A resistor R7 and capacitor C6 provides high frequency stabilisation in the amplifier loop. The output is applied to meter M.

The differentiation unit comprises an input capacitor C5 and resistor R9 in the feed back loop.

In order to obtain the required response from the differentiating circuit it is necessary to introduce a variable time constant and to control this variation by the input of the logarithmic amplifier. In the arrangement in FIG. 3 this is achieved by incorporating a variable time constant circuit in the feed back path of the amplifier constituted by capacitor C5 and indirectly heated thermistor TH2. The heater current of this thermistor is derived from the logarithmic amplifier output supplied through a thermistor drive amplifier VT5, VT6 which gives a large voltage gain. The gain is set to produce half a decade reduction in the variable time constant for every decade increase in the ionisation chamber current.

In order to ensure that ambient temperature changes do not influence the characteristics of the thermistor TH2, a second compensating thermistor TH1 provides a compensating current at the drive amplifier input. The thermistor TH1 is shunted by a resistor R8 whose value is chosen to linearise the thermistor characteristic over the range of 0° C. to 40° C. A small amplitude, approximately 200 mv., square wave is fed through the thermistor drive amplifier via capacitor C7, the A.C. output from this wave, is used to hold off a warning circuit (not shown) so that if either the drive amplifier, or thermistor TH2, should fail, this warning circuit will operate.

Two diodes, MR1 and MR2, are responsive to a rapidly varying signal at the differentiation input to reduce the effect of C5 and reduce the time constant in the differentiating circuit.

In FIG. 4, the thermistor TH2 (of FIG. 3) is replaced by a chopper transistor VT11 in the time constant control circuit. By switching of the transistor VT11, the "on-off" periods may be so controlled that a mean impedance is presented by the transistor between the zero volt line and the junction P and this mean impedance can be controllably varied by varying the on-off ratio.

A fixed resistor R12 is connected between the transistor emitter and the point P and the transistor base is connected to the output of a blocking oscillator 10 supplied with an input from the logarithmic amplifier.

The blocking oscillator which is of conventional form with an oscillator transistor VT12, has an input connection from the logarithmic amplifier output through resistor R10 to the base of a control transistor VT10, the emitter of which is connected to earth and the collector to transformer winding W1 through capacitor C10. The secondary winding W2 is connected across a wave form clipper diodes D1, D2 to the base of the switched chopper transistor VT11. The latter replaces the thermistor TH2 of FIG. 3; the remainder of the differentiating amplifier is similar to that of FIG. 3.

The control transistor VT10 is biased into conduction by resistor R10 to maintain a minimum pulse rate, and pulses passed to the base of transistor VT11.

The desired characteristic for the time constant control circuit (which is determined by basic noise considerations) is a variation of ½ decade for every decade of ion chamber current. Hence, as the input to the blocking oscillator is taken from the logarithmic amplifier output, the time constant must vary logarithmically ½ decade/volt. But the control characteristic of the blocking oscillator is a pulse with a mark/space ratio (corresponding to on-off ratio of the switched transistor) proportional to the input current, thus giving a time constant control impedance which is inversely proportional to the input current. Hence, if the control transistor is current driven by the control signal the time constant will be linearly not logarithmically related thereto.

To obtain the required relationship of ½ decade time constant change per decade ion current change, the input current must vary logarithmically with control voltage at ½ decade of input current per volt from the logarithmic amplifier.

This effect is achieved in this example by use of the forward diode characteristic of the control transistor VT10 which in common with all semi-conductor diodes has a basically logarithmic relationship between voltage and current. The transistor VT10 is subject to drift under ambient temperature changes of about 2 mv./° C. and, to compensate for this drift, a thermistor TH3 in parallel with resistor R11 is connected between the positive line and the base of the control transistor.

The final circuit gives a logarithmic impedance variation in the chopper transistor over 2½ decades and the impedance range can be adjusted within limits of saturation in the chopper transistor over 2½ decades and the resistance in series with the chopper transistor.

A further use of the period meter described above is in the obtaining of a fast response at high ionisation currents, accepting overshoot at low currents.

We claim:

1. A period meter having a logarithmic amplifier providing an output proportional to the logarithm of the input current and a differentiating amplifier connected to receive the output of the logarithmic amplifier, a variable time constant circuit in the differentiating amplifier including a circuit element which contributes to a time constant of the differentiating amplifier and is controllable independently by means of a circuit for changing the impedance of the circuit element in accordance with the output of the logarithmic amplifier during operation as the period meter.

2. A period meter as claimed in claim 1 in which the circuit element is an indirectly heated thermistor, having a heater, and means deriving heater current for said heater from said output of the logarithmic amplifier.

3. A period meter as claimed in claim 2 in which compensation is made for the effects of ambient temperature variations on the indirectly heated thermistor by adding to the thermistor heater current a component of current from an independent supply which is determined in magnitude and sign by a control thermistor exposed to ambient temperature variations.

4. A period meter as claimed in claim 3 including a current amplifier connected to amplify said heater current for the indirectly heated thermistor and connections applying to the input of the current amplifier, current from the control thermistor, current proportional to the output power of said logarithmic amplifier, and an A.C. monitoring signal.

5. A period meter as claimed in claim 1 in which the circuit element includes a transistor chopper, and means responsive to the output of the logarithmic amplifier for variably switching the transistor choppers so as to form a variable impedance.

6. A period meter including a radiation sensitive device yielding a current proportional to radiation flux, a logarithmic amplifier connected to receive input current from the device and provide an output proportional to the logarithm of the input current, a differentiating amplifier, means for supplying to the differentiating amplifier the output of the logarithmic amplifier, a variable time constant circuit including a component which makes a variable contribution to the time constant of the differentiating amplifier and means responsive to the output of the logarithmic amplifier for varying the said contribution in accordance with the output of the logarithmic amplifier.

7. A period meter comprising a logarithmic amplifier providing an output proportional to the logarithm of an input current, and a differentiating amplifier connected to differentiate the output of the logarithmic amplifier, the differentiating amplifier including a smoothing capacitor connected to a variable potential divider means arranged to control the smoothing effect of said capacitor, means responsive to the output of the logarithmic amplifier for controlling said variable potential divider means to reduce the smoothing time constant of the differentiating amplifier as the output of the logarithmic amplifier increases, the time constant of the logarithmic amplifier being small compared with that of the differentiating amplifier.

8. A period meter for a nuclear reactor comprising a logarithmic amplifier providing an output proportional to the logarithm of an input current and a differentiating amplifier connected to differentiate the output of the logarithmic amplifier, the differentiating amplifier having a differentiating resistor connected between an input terminal and an output terminal, a smoothing capacitor having one side connected to said output terminal and the other side connected to a tapping on a resistive potential divider connected between said input terminal and a point at earth potential, means responsive to the output of the logarithmic amplifier for controlling the effective resistance of an element of said divider to reduce the smoothing time constant of the differentiating amplifier as the output of the logarithmic amplifier increases, and the time constant of the logarithmic amplifier being small compared with that of the differentiating amplifier.

9. A period meter for a nuclear reactor comprising a logarithmic amplifier providing an output proportional to logarithm of an input current, a differentiating amplifier connected to differentiate the output of the logarithmic amplifier, the differentiating amplifier including a smoothing capacitor connected in series with a resistor in a feed back path of the differentiating amplifier, means connecting a point between said capacitor and resistor with earth, said means comprising a transistor element having its output electrodes connected to said point and to earth and a base electrode coupled to the output from the logarithmic amplifier.

10. A period meter for a nuclear reactor comprising a logarithmic amplifier providing an output proportional to logarithm of an input current applied thereto, a differentiating amplifier connected to differentiate the output of the logarithmic amplifier, the differentiating amplifier having a feed back path, a resistor in said feedback path, a smoothing capacitor connected in series with said resistor, a circuit interconnecting a point in said feedback path between the resistor and the capacitor with earth, and a thermistor element of the indirectly heated type, the thermistor having a variable resistance member connected in series in said circuit and a heating filament connected to receive heating current from the output of the logarithmic amplifier.

11. A period meter as claimed in claim 10 including a further thermistor exposed to temperature ambient to the differentiating amplifier and means arranged to add a component of current derived from a supply independent of the logarithmic amplifier to the heating current of the indirectly heated thermistor, said component of current being determined in magnitude and sign by the further thermistor.

References Cited by the Examiner

UNITED STATES PATENTS

| 2,968,727 | 1/1961 | Otis | 250—83.6 |
| 2,986,636 | 5/1961 | Carlson | 250—83.1 |
| 3,069,545 | 12/1962 | Lide | 250—83.1 |

RALPH G. NILSON, *Primary Examiner.*